US006406213B1

(12) United States Patent
Dohman et al.

(10) Patent No.: US 6,406,213 B1
(45) Date of Patent: Jun. 18, 2002

(54) ONE-PIECE WINDOW CONNECTOR

(75) Inventors: Francis J. Dohman, Chatsworth; Alan R. Gerber, Forrest; Steven R. Simonson, Chatsworth; Larry J. Flynn, Bloomington, all of IL (US)

(73) Assignee: Quanex Corporation, Houston, TX (US)

( * ) Notice: Subject to any disclaimer, the term of this patent is extended or adjusted under 35 U.S.C. 154(b) by 5 days.

(21) Appl. No.: 09/605,210

(22) Filed: Jun. 28, 2000

(51) Int. Cl.[7] .................................................. F16B 12/36

(52) U.S. Cl. ....................... 403/298; 403/311; 403/283; 403/292

(58) Field of Search ................................ 403/292, 298, 403/300, 302, 309, 310, 311, 314, 283, 294; 52/712, 715, 716.8, 717.01, 204.58, 204.57; 411/339, 510, 913

(56) References Cited

U.S. PATENT DOCUMENTS 3,799,685 A * 3/1974 Smith et al.
5,177,920 A * 1/1993 Rafeld
5,209,599 A * 5/1993 Kronenberg
5,560,731 A * 10/1996 Kronenberg
5,603,582 A 2/1997 Loh ........................... 403/298
5,642,957 A * 7/1997 Lange

* cited by examiner

*Primary Examiner*—Lynne H. Browne
*Assistant Examiner*—Tomlyne A Malcolm
(74) *Attorney, Agent, or Firm*—Howard & Howard

(57) ABSTRACT

A one-piece window connector assembly, or clip, is disclosed. The window clip is inserted into adjacent window spacers to permanently connect the spacers that form a window frame and space multiple panes of glass. The window clip includes a central base having first and second side rails that contribute to the overall rigidity of the window clip as the window clip is inserted into the window spacers. These-rails include locking barbs that enable the clip to permanently lock the window spacers together. The window clip is characterized by each rail extending from the central base through a reverse bend such that internal and external flaps are formed in the rails to increase the rigidity of the rails and assist in more efficient insertion of the window clip into the window spacers.

27 Claims, 2 Drawing Sheets

ONE-PIECE WINDOW CONNECTOR

BACKGROUND OF THE INVENTION

1. Technical Field

The subject invention relates to a one-piece window connector assembly for connecting adjacent hollow window spacers utilized in an insulating region between multiple panes of glass to space the glass panes and also to form a frame between the glass panes.

2. Description of the Prior Art

Conventional window connector assemblies for connecting adjacent hollow window spacers are known in the art. The window connector assemblies are forcefully inserted into adjacent hollow window spacers to permanently connect the spacers. It is understood by those skilled in the art that the window spacers, connected by the window connector assemblies, are then continuously fed into an automatic frame-bending machine where adjacent spacers are formed into a frame for a window of predetermined dimensions. The window connector assemblies realize specific bending and torsional stresses as the assemblies are forcefully inserted into the hollow window spacers in preparation for forming the frame for the window. Furthermore, even after the frame is formed, the window connector assemblies realize additional stresses at the connection sites where the connector assemblies permanently connect adjacent spacers. As a result, it is generally recognized that such assemblies must possess a certain rigidity, or stiffness, in order to satisfactorily resist these stresses.

To increase rigidity and resist these bending and torsional stresses, many conventional window connector assemblies incorporate highly complex designs.

More specifically, conventional window connector assemblies frequently incorporate two, and even three-piece designs to increase the overall rigidity of the assembly. Alternatively, to increase rigidity and resist these bending and torsional stresses, window connector assemblies incorporate side walls, or rails, extending the length of the window connector assembly which are manufactured at increased thicknesses or from particularly strong steels. These rails contribute to the overall rigidity of the window connector assembly and also help guide the connector assembly into the adjacent hollow window spacers. For example, in U.S. Pat. No. 5,209,599 to Kronenberg, the window connector assembly incorporates single-flapped rails having a preferred thickness of 0.5 mm and is manufactured from sheet steel. In assemblies that incorporate two and three-piece designs, and in assemblies that incorporate relatively thick, single-flapped rails manufactured from various steels, more material is required to manufacture the window connector assemblies, and consequently the conventional window connector assemblies of the prior art are more expensive. Also, the conventional window connector assemblies that are steel are more difficult to manufacture because steel is difficult to stamp and requires a larger-duty press.

Due to the inefficiencies identified in conventional window assemblies, it is desirable to implement a one-piece window connector assembly that can be manufactured from less material, a less expensive material, or a more easily manufactured (stamped) material, while still withstanding the bending and torsional stresses realized upon insertion of the assembly into adjacent window spacers.

SUMMARY OF THE INVENTION AND ADVANTAGES

A one-piece window connector assembly for connecting adjacent hollow window spacers is disclosed. The assembly includes a central base having first and second rails. The rails are substantially parallel and are disposed at opposite sides of the assembly for guiding the assembly into the adjacent hollow window spacers. Each of the rails include a distal edge and a plurality of locking barbs formed within the distal edge of each rail. The locking barbs lock the window connector assembly into the adjacent hollow window spacers to permanently connect the spacers before the spacers are fed into an automatic frame-bending machine to form a frame.

The one-piece window connector assembly of the subject invention is characterized by each of the rails extending away from the central base through a reverse bend to the distal edge such that the distal edges of the rails extend back toward the central base. As such, internal and external flaps of each rail are formed with the reverse bend between the internal and external flaps, and the rigidity of the entire window connector assembly is increased.

Accordingly, the subject invention provides a one-piece window connector assembly having increased rigidity resulting from dual-flapped rails extending through a reverse bend that the overall rigidity of the assembly is increased and the assembly is capable of withstanding the bending and torsional stresses realized upon forceful insertion of the window connector assembly into the adjacent hollow window spacers for forming of the frame. Additionally, this invention provides that, due to the particular construction of the subject window connector assembly, the assembly can be formed of a less expensive, easily manufactured material such as aluminum.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
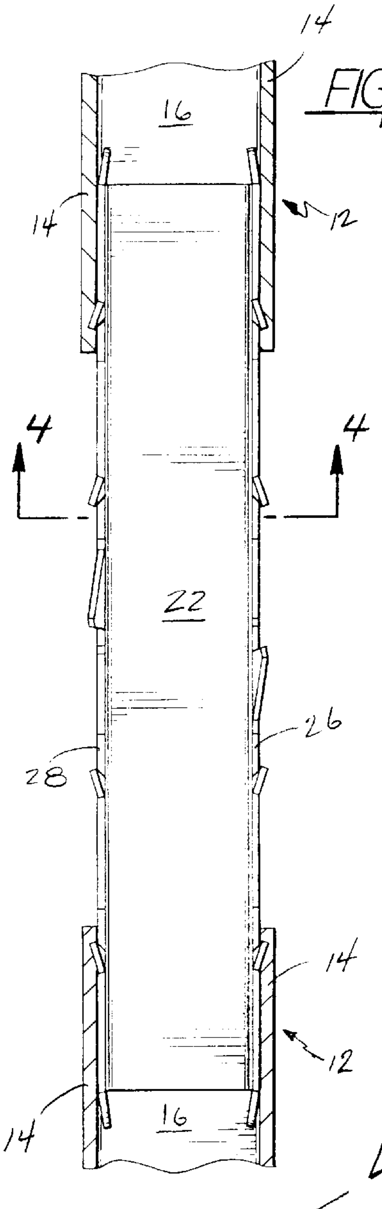
FIG. 1 is a partially cross-sectional top view of a one-piece window connector assembly of the subject invention inserted into adjacent hollow window spacers.

Referring now to the Figures, wherein like numerals indicate like or corresponding parts throughout the several views, a window clip, or one-piece window connector, is shown at 10. For descriptive purposes only, the one-piece window connector of the subject invention is described below in terms of a one-piece window connector assembly 10. Referring to FIG. 1, the window connector assembly 10 is inserted into adjacent hollow window spacers 12 to connect the spacers 12 to form a window frame that is placed in an insulating region between multiple panes of glass (not shown) to space the glass panes. That is, the frame is made up of the window connector assembly 10 and the window spacers 12. As discussed in the background section, the connected window spacers 12 are fed into an automatic frame-bending machine (not shown in the Figures) to form the frame. As appreciated, the window spacers 12 include a top wall, a bottom wall 29, and two side walls 14 defining tubing having a hollow length, or longitudinal cavity 16, with a rectangular cross-section for forming the frame.

Alternatively, the window connector assembly 10 of the subject invention can be utilized independent of the frame-bending machine at a construction site to connect predetermined lengths of window spacers 12. As such, it is within the scope of the claimed invention that the window connector assembly 10 be utilized at the construction site to connect adjacent window spacers 12 that may even form corners of the frame. In other words, the connector assembly 10 may be bent into an L-shaped configuration without deviating from the scope of the subject invention.

Figure 2:
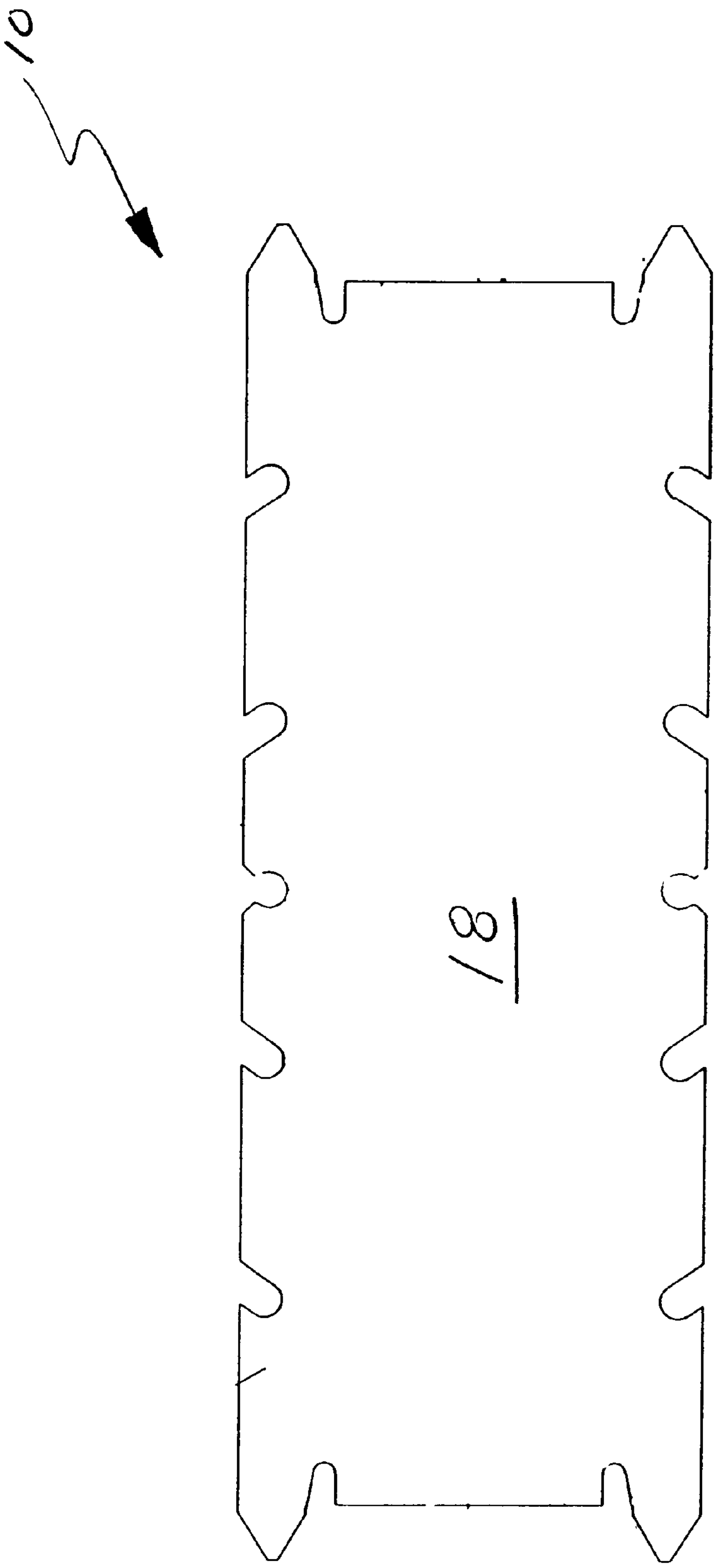
FIG. 2 is a two-dimensional top view of the window connector assembly as a one-piece aluminum blank prior to stamping.

The window connector assembly 10 of the subject invention if formed from a metal stamping or forming process. To form the window connector assembly 10, the metal stamping or forming processes begin with a one-piece metal blank 18 as shown in FIG. 2. In the preferred embodiment of the subject invention, the metal of the one-piece metal blank 18 is an aluminum alloy. Further, the aluminum alloy includes a particular, predetermined temper. Preferred aluminum alloys include, but are not limited to, Aluminum Association Alloy Nos. 3105, 3003, and 5052 as are known in the art. It is to be understood that the aluminum alloy of the subject invention may exceed the scope of the aluminum alloys listed above without varying the scope of the invention as claimed. Additionally, the temper of the aluminum alloy selected for the manufacture of the window connector assembly 10 may vary depending on the particular tensile and yield strengths desired.

Figure 4:
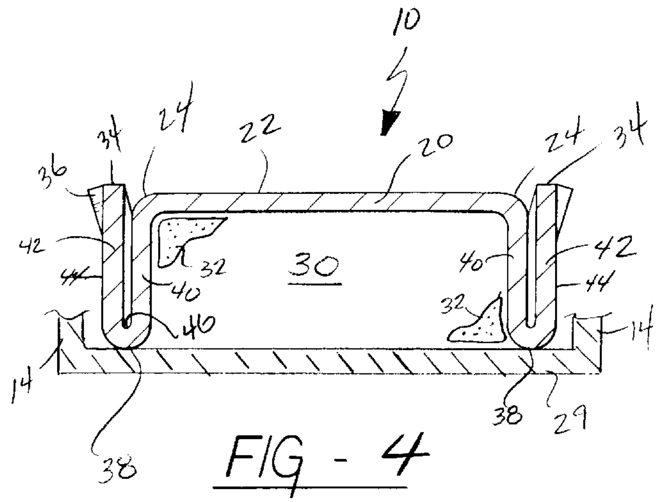
FIG. 4 is a cross-sectional side view taken along the line 4—4 of FIG. 2 illustrating internal and external flaps of the first and second rails.
Figure 3:
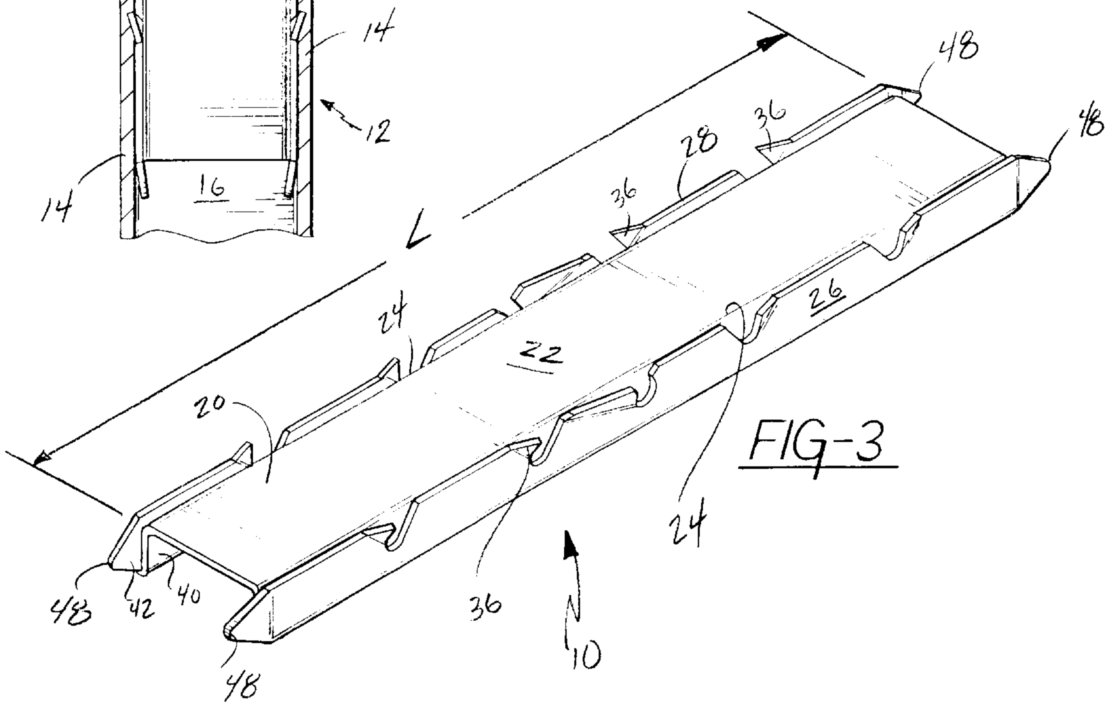
FIG. 3 is an enlarged perspective view of the window connector assembly illustrating first and second rails of the assembly.

Referring now to FIGS. 3 and 4, the window connector assembly 10 includes a central base 20. The central base 20 includes a top surface 22, lateral edges 24, and a length L. The central base 20 further includes first 26 and second 28 rails. The central base 20 and the first 26 and second 28 rails of the subject invention define a generally U-shaped cross-section of the window connector assembly 10. The U-shaped cross-section, and more specifically the top surface 22 of the central base 20 operating in conjunction with the bottom wall 29 of the window spacers 12, includes an under-cavity 30 where a desiccant material 32 is applied to remove moisture from any gases occupying the insulating region between the multiple panes of glass.

As shown in the Figures, the rails 26, 28 are substantially parallel to each other and are disposed at opposite sides of the assembly 10. That is, the first rail 26 is disposed at one lateral edge 24 of the central base 20, and the second rail 28 is disposed at the other lateral edge 24 of the central base 20. More specifically, the rails 26, 28 extend longitudinally along the lateral edges 24 of the central base 20 and beyond the length L of the central base 20. As such, the rails 26, 28 contribute to the overall rigidity of the window connector assembly 10. The rails 26, 28 include a distal edge 34, and a plurality of locking barbs 36 are formed within the distal edges 34 of the rails 26, 28. The function of the locking barbs 36 will be discussed further hereinbelow.

Referring primarily to FIG. 4, each of the rails 26, 28 extend away from the central base 20 through a reverse bend 38 to the distal edge 34. As such, the distal edges 34 of each rail 26, 28 extend back toward the central base 20. Each of the rails 26, 28 more specifically include an internal flap 40 and an external flap 42. The distal edges 34 of each rail 26, 28 are disposed on the external flaps 42. During stamping of the one-piece metal blank 18, the external flap 42 is folded upon the internal flap 40 to define the reverse bend 38 between the internal and external flaps 40, 42. More specifically, the external flap 42 is folded upon the internal flap 40 outwardly from the central base 20. Each of the external flaps 42 include an outer facing 44. Since the external flap 42 is folded outwardly from the central base 20, it is the outer facing 44 of each external flap 42 that contacts the side walls of the window spacers 12 as the window connector assembly 10 is inserted into the spacers 12.

The internal flaps 40 extend from the lateral edges 24 of the central base 20 to form a substantially 90° bend between the internal flaps 40 and the central base 20. Referring to the window connector assembly 10 as oriented in FIGS. 3 and 4, the internal flaps 40 extend downwardly from the central base 20. Subsequently, the reverse bends 38 form a substantially 180° bend between the external flaps 42 and the internal flaps 40. The external flaps 42 extend upwardly from the internal flaps 40 to form the reverse bends 38. That is, the internal flaps 40 of the rails 26, 28 extend downwardly from the central base 20 through the reverse bend 38 to the distal edge 34 such that the external flaps 42, including the distal edges 34, extend upwardly back toward the central base 20. The internal and external flaps 40, 42 establish dual-flapped rails 26, 28 that significantly increase the rigidity that the rails 26, 28 contribute to the overall rigidity of the window connector assembly 10. Consequently, the window connector assembly 10 can be manufactured at lower thicknesses and from more cost effective materials while still withstanding bending and torsional forces realized upon the forceful insertion of the assembly 10 into the cavities 16 of the adjacent window spacers 12.

It is to be understood that the window connector assembly 10 can be oriented in a manner other than as shown in FIGS. 3 and 4, such as 'upside down,' without varying the scope of the subject invention. In such a case, the internal flaps 40 would be described to extend upwardly from the central base 20, and the external flaps 42 would be described to extend downwardly from the internal flaps 40 to form the reverse bends 38.

The distal edges 34 of the rails 26, 28 extend back toward the central base 20 such that the rails 26, 28 are adjacent the central base 20 yet extend beyond the top surface 22 of the central base 20. More specifically, it is the external flaps 42 of each rail 26, 28 that are folded to extend back toward the central base 20 such that the external flaps 42 are adjacent the central base 20 yet extend beyond the top surface 22. The locking barbs 36 introduced above are disposed on and protrude from the external flaps 42 of the rails 26, 28. As such, the locking barbs 36 of each rail 26, 28 are adjacent the central base 20 and extend beyond the top surface 22 of the central base 20. At this position, the locking barbs 36 protrude outwardly from the external flaps 42 and beyond the outer facings 44 of the external flaps 42 such that the locking barbs 36 project into the side walls 14 of the window spacers 12 as the window connector assembly 10 is forcefully inserted into the window spacers 12 to permanently lock the assembly 10 in the cavities 16 of the adjacent window spacers 12. The locking barbs 36 are appropriately angled to permit one-way insertion of the window connector assembly 10 into the cavities 16 of the window spacers 12, while at the same time preventing removal of the connector assembly 10 from the cavities 16 of the window spacers 12.

After the reverse bends 38 are formed, the internal flaps 40 are substantially parallel to the external flaps 42 in a longitudinal direction thereof. However, a channel 46 is formed between the flaps 40, 42 such that the external flaps

42 are spaced from and do not abut the internal flaps 40. The channel 46 is formed between the flaps 40, 42 to allow the external flaps 42 to move, or flex, relative to the internal flaps 40 upon insertion of the assembly 10 into the adjacent hollow window spacers 12. The channels 46 formed between the internal and external flaps 40, 42 of each rail 26, 28 enable the external flaps 42 to compress inwardly relative to the internal flaps 40 for more efficient insertion of the window connector assembly 10 into the adjacent hollow window spacers 12. Of course, without varying the scope of the subject invention, the external flaps 42 can be folded upon the internal flaps 40 such that the external flaps 42 do actually abut the internal flaps 40 where the channel 46 is not formed. This provides even more rigidity to the window connector assembly 10.

The rails 26, 28, including the internal and external flaps 40, 42, extend along the central base 20 beyond length L to form opposing tapered ends 48. The opposing tapered ends 48 operate to effectively guide the assembly 10 into the cavities 16 of the adjacent hollow window spacers 12 during forceful insertion of the assembly 10 into the cavities 16. More specifically, the opposing tapered ends 48 are formed exclusively from the external flaps 42 of the rails 26, 28 extending longitudinally along the central base 20 beyond length L.

The invention has been described in an illustrative manner, and it is to be understood that the terminology that has been used is intended to be in the nature of words of description rather than of limitation.

Obviously, many modifications and variations of the present invention are possible in light of the above teachings. Therefore, it is to be understood that within the scope of the appended claims, the invention may be practiced otherwise than as specifically described.

What is claimed is:

1. A one-piece window connector for connecting adjacent hollow window spacers, said connector comprising:

a central base having first and second rails, said rails being substantially parallel to each other and each including a distal edge;

a plurality of locking barbs formed within each of said distal edges of said rails;

each of said rails extending away from said central base through a reverse bend to said distal edge such that said distal edges of said rails extend back toward said central base for increased rigidity of said rails upon insertion of said connector into the adjacent hollow window spacers.

2. A connector as set forth in claim 1 wherein each of said rails further include an internal flap and an external flap, said external flap folded upon said internal flap to define said reverse bend therebetween.

3. A connector as set forth in claim 2 wherein said locking barbs are disposed on and protrude from said external flaps of said rails.

4. A connector as set forth in claim 2 wherein said central base includes a top surface, said external flap folded upon said internal flap such that said distal edges of said rails extend back toward said central base beyond said top surface of said central base.

5. A connector as set forth in claim 2 wherein said external flap is folded upon said internal flap outwardly from said central base to define said reverse bend therebetween.

6. A connector as set forth in claim 5 wherein said external flap is folded upon said internal flap outwardly from said central base such that said distal edges of said rails are adjacent said central base.

7. A connector as set forth in claim 2 wherein said central base further includes lateral edges and a length L.

8. A connector as set forth in claim 7 wherein said internal flaps extend from said lateral edges of said central base to form a substantially 90° bend between said internal flaps and said central base.

9. A connector as set forth in claim 8 wherein said reverse bends form a substantially 180° bend between said external flaps and said internal flaps.

10. A connector as set forth in claim 9 wherein said internal flaps are substantially parallel to said external flaps along a longitudinal length thereof.

11. A connector as set forth in claim 10 wherein a channel is formed between said external flaps and said internal flaps such that said external flaps are spaced from said internal flaps for allowing said external flaps to move relative to said internal flaps upon insertion of said connector into the adjacent hollow window spacers.

12. A connector as set forth in claim 7 wherein said rails extend longitudinally along said lateral edges of said central base beyond said length L of said central base.

13. A connector as set forth in claim 12 wherein said rails extend longitudinally along said central base beyond said length L to form opposing tapered ends of said rails for guiding said connector into the adjacent hollow window spacers.

14. A connector as set forth in claim 13 wherein said opposing tapered ends are formed exclusively from said external flaps of said rails extending longitudinally along said central base beyond said length L.

15. A connector as set forth in claim 2 wherein said internal flaps extend downwardly from said central base through said reverse bend to said distal edge such that said distal edges of said rails extend upwardly back toward said central base.

16. A connector as set forth in claim 15 wherein said external flaps extend upwardly from said internal flaps to form said reverse bends.

17. A connector as set forth in claim 3 wherein said external flaps of said rails each include an outer facing.

18. A connector as set forth in claim 17 wherein said locking barbs protrude outwardly from said external flaps and beyond said outer facings of said external flaps.

19. A connector as set forth in claim 2 wherein said central base, said rails, including said internal and external flaps, and said reverse bend are formed from a one-piece blank.

20. A connector as set forth in claim 15 wherein said one-piece blank is metal.

21. A connector as set forth in claim 16 wherein said metal is an aluminum alloy.

22. A connector as set forth in claim 2 wherein said central base and said rails define a generally U-shaped cross-section having an under-cavity.

23. A connector as set forth in claim 22 wherein a desiccant material is applied into said under-cavity.

24. A window frame for separating multiple panes of glass, said frame comprising:

a one-piece window connector having a central base with first and second rails, said rails being substantially parallel to each other and each including a distal edge;

a plurality of locking barbs formed within each of said distal edges of said rails;

a plurality of adjacent hollow window spacers each defining a corresponding cavity for allowing insertion of said connector;

each of said rails extending away from said central base through a reverse bend to said distal edge such that said distal edges of said rails extend back toward said central base for increased rigidity of said rails upon insertion of said connector into said cavities of said adjacent window spacers.

25. A window frame as set forth in claim 24 wherein each of said rails further include an internal flap and an external flap, said external flap folded upon said internal flap to define said reverse bend therebetween.

26. A window frame as set forth in claim 25 wherein said locking barbs are disposed on and protrude from said external flaps of said rails for locking said connector in said cavities of said adjacent window spacers.

27. A window frame as set forth in claim 26 wherein said external flaps of said rails extend longitudinally along said central base to form opposing tapered ends of said rails to guide said connector into said cavities of said adjacent window spacers.

* * * * *